US008671151B2

(12) United States Patent
Joshi et al.

(10) Patent No.: US 8,671,151 B2
(45) Date of Patent: Mar. 11, 2014

(54) MAINTAINING ITEM-TO-NODE MAPPING INFORMATION IN A DISTRIBUTED SYSTEM

(75) Inventors: Vikram Joshi, Los Gatos, CA (US); Alexander Tsukerman, Foster City, CA (US); Arvind Nithrakashvap, San Francisco, CA (US); Jia Shi, Redwood City, CA (US); Tudor Bosman, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1344 days.

(21) Appl. No.: 11/657,778

(22) Filed: Jan. 24, 2007

(65) Prior Publication Data
US 2008/0177741 A1 Jul. 24, 2008

(51) Int. Cl.
*G06F 15/16* (2006.01)
(52) U.S. Cl.
USPC ............ 709/208; 709/209; 709/210; 709/211
(58) Field of Classification Search
USPC ........................................................ 709/208
See application file for complete search history.

(56) References Cited

U.S. PATENT DOCUMENTS

| 6,115,713 | A * | 9/2000 | Pascucci et al. ....................... 1/1 |
| 6,181,689 | B1 * | 1/2001 | Choung et al. ................. 370/352 |
| 6,574,234 | B1 * | 6/2003 | Myer et al. .................... 370/462 |
| 6,633,538 | B1 * | 10/2003 | Tanaka et al. .................. 370/222 |
| 7,269,648 | B1 * | 9/2007 | Krishnan et al. ............... 709/224 |
| 7,457,236 | B2 * | 11/2008 | Cheng et al. ................... 370/220 |
| 7,571,227 | B1 * | 8/2009 | Pabla ............................. 709/224 |
| 2003/0140108 | A1 * | 7/2003 | Sampathkumar ............. 709/208 |
| 2004/0078449 | A1 * | 4/2004 | Tanaka et al. ................. 709/208 |
| 2005/0201310 | A1 * | 9/2005 | Fujioka ......................... 370/310 |
| 2005/0237926 | A1 * | 10/2005 | Cheng et al. ................... 370/216 |
| 2006/0010441 | A1 * | 1/2006 | Jahn et al. ..................... 718/100 |
| 2006/0143178 | A1 * | 6/2006 | Chan et al. ....................... 707/9 |
| 2006/0265420 | A1 * | 11/2006 | Macnaughton et al. ... 707/104.1 |

* cited by examiner

*Primary Examiner* — Umar Cheema
(74) *Attorney, Agent, or Firm* — Hickman Palermo Truong Becker Bingham Wong LLP

(57) ABSTRACT

A method and apparatus for maintaining an item-to-node mapping among nodes in a distributed cluster is provided. Each node maintains locally-stored system-state information indicating that node's understanding of which master nodes are alive and dead. Instead of employing a global item-to-node mapping, each node acts upon a locally determined mapping based on its locally-stored system-state information. For any two nodes with the same locally-stored system-state information, the locally determined mapping is the same. A node updates its locally-stored system-state information upon detecting a node failure or receiving a message from another node indicating different locally-stored system-state information. The new locally-stored system-state information is transmitted on a need-to-know basis, and consequently nodes with different item-to-node mappings may operate concurrently. Mechanisms to avoid nodes assuming conflicting ownership of items are employed, thus allowing node failures to propagate via asynchronous messaging instead of requiring a cluster-wide synchronization event.

47 Claims, 11 Drawing Sheets

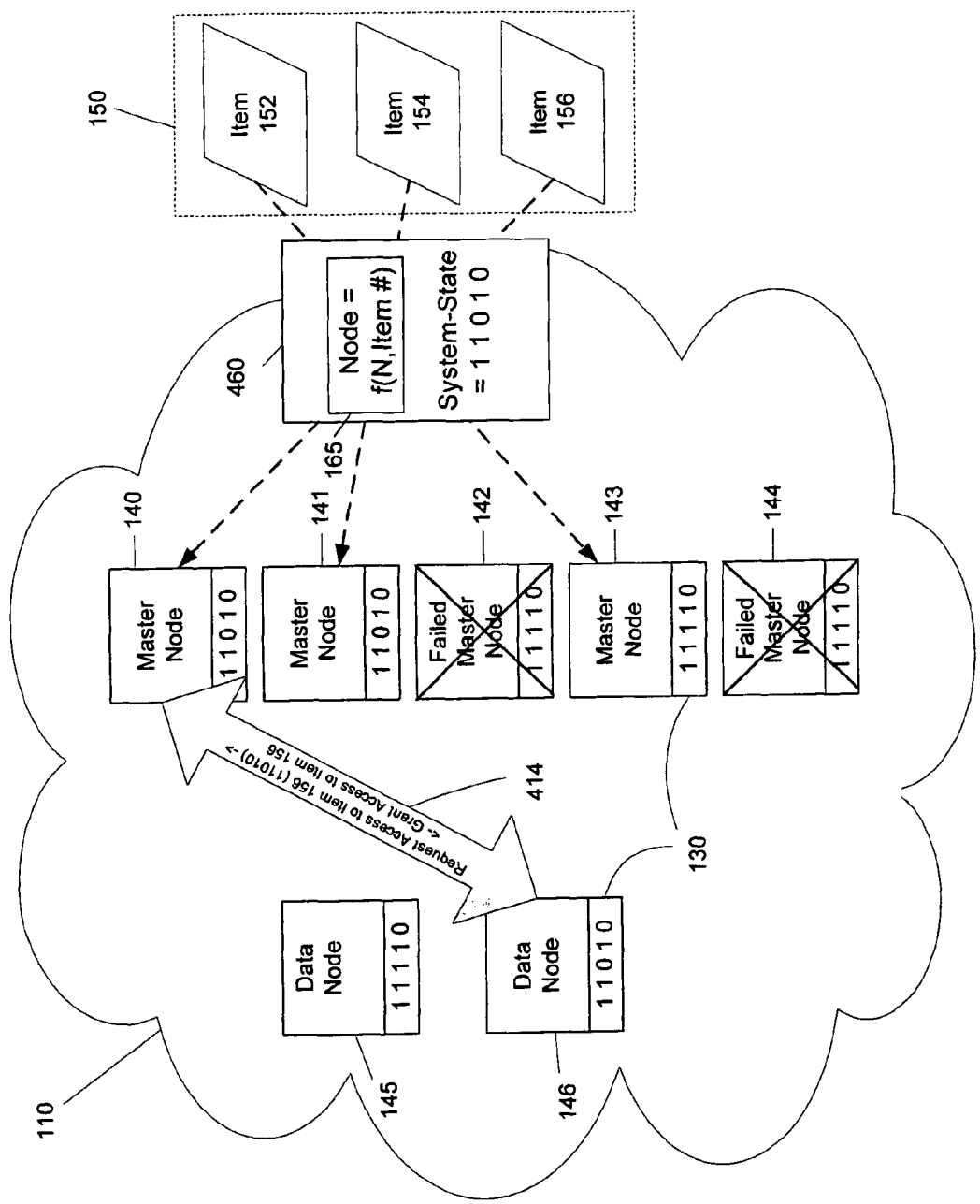

MAINTAINING ITEM-TO-NODE MAPPING INFORMATION IN A DISTRIBUTED SYSTEM

FIELD OF THE INVENTION

The present invention relates generally to distributed computer systems and, more particularly, to approaches for maintaining an item-to-node mapping among nodes within a cluster without having to take the cluster down to resynchronize the mapping information when nodes fail.

BACKGROUND

A "distributed system" is a system that includes multiple processing entities. Such processing entities are referred to herein as "nodes". The nodes of a distributed system may be, for example, individual computers or processors within multi-processor computers.

A "cluster" is a distributed system that results from distributing computing resources together in such a way that they behave like a single resource. Clustering is often used for purposes of parallel processing, load balancing, and fault tolerance. One common example of a cluster is a set of computers, or "nodes," that are configured so that they behave like a single computer.

Each computer in the cluster has shared access to a set of resources. A resource is, generally, any item that can be shared by the computers in the cluster. A resource may also be referred to as an item or object. A common example of a resource is a block of memory in which information is stored. The block of memory may be part of a node in the cluster or may be external to the cluster, such as a database block.

One example of a cluster is a database cluster. A database cluster comprises multiple nodes that each executes an instance of a database server that each facilitates access to a shared database. Among other functions of database management, a database server governs and facilitates access to the particular database by processing requests by clients to access data in the database.

Typically, resources are assigned to master nodes, where each master node coordinates access to the resources assigned to it. A master node has a global view of the state of the shared resources that it masters at any given time and acts as a coordinator for access to the shared resource. For example, a master node coordinates and is aware of which node is currently granted a lock on the shared resource (and what type of lock) and which nodes are queued to obtain a lock on the shared resource. Typically, the master node's global view of the status of a shared resource is embodied in metadata associated with the resource.

Clusters employing master nodes to coordinate resource sharing are sometimes described as distributed namespaces. The master nodes are said to manage a namespace of resources. The namespace describes various aspects of the resources within the cluster, such as the location and lock status of a resource (i.e. the metadata associated with each resource). Because different parts of this namespace are maintained on different master nodes, the namespace is said to be distributed across master nodes. The master nodes may therefore be considered namespace nodes. Although the concepts discussed herein will be described in terms of clusters and master nodes, it should be clear that the concepts apply equally to distributed namespaces.

Each shared resource is mapped to one master node. Various mechanisms may be used to establish the resource-to-master mapping. Techniques for using hash tables to establish the resource-to-master mapping are described in detail, for example, in U.S. Pat. No. 6,363,396. Commonly, mechanisms for establishing a resource-to-master mapping will be dependent on the number (N) of currently active master nodes (active nodes to which items are currently mapped). For example, one such mechanism employs a hashing function wherein each resource is represented by a unique number (r). The resource-to-master mapping for a particular resource is established by the function: r mod N. Thus, a resource represented by the number 128 in a cluster with 10 active master nodes would be mapped to node 8. The process for determining the node to which a resource is mapped is sometimes known as resource lookup or resolution.

Different systems may use different parameters to generate their resource-to-node mappings. The parameter values that a system uses to generate its resource-to-node mappings are collectively referred to herein as the "mapping parameter values" of the system. Thus, the number of currently active master nodes (N) is a mapping parameter value of a system that determines resource-to-master mappings based on the function: r mod N.

Typically, the mapping parameter values used by a system change in response to changes in the state of the system. Thus, when the state of the system changes, the mapping parameter values change, and when the mapping parameter values change, so does the resulting resource-to-node mappings. For example, for systems in which N is the mapping parameter value, N can vary dynamically when nodes fail.

Relying on the number of live master nodes as a mechanism for dividing up resources between master nodes assures that no resource will be orphaned (i.e. left without a master) upon the failure of its master. The remapping of an item to a new node as a result of a new resource-to-node mapping is known as re-mastering.

In conventional distributed systems, all nodes need to be informed of any changes in the system that affect the mapping parameter values, since the mapping parameter values dictate the resource-to-node mappings that the nodes should use. If all nodes are not using the same mapping parameter values, problems can arise. For example, if the number of remaining live nodes after a master node fails (N−1) is not propagated to all of the remaining nodes, then it is possible for different nodes to have different views of the live master nodes in the system, resulting in incorrect mappings. This can cause the cluster to break into two or more clusters (sometimes referred to as a split brain).

An example of "split brain" is as follows. In this example, node 0 may believe there are N nodes in the cluster and resolve object X to node 8; node 1 may believe that there are N−1 nodes and resolve X to node 9. If node 8 also believes that there are N nodes, it might fetch X from the database, as it is not aware that the most current version of the object has been recovered on node 9 (based on N−1 value fed to the hash functions). Having two nodes, each of which believes it has the latest version of the object, is a classic case of a split-brain syndrome within the cluster.

To prevent such problems from occurring, most clusters resort to cluster-wide synchronization to agree on the mapping parameter values. This synchronization halts all operations that require the assistance of any master node (e.g. locking a resource), including requests for resources managed by surviving master nodes, which should ideally be unaffected. This halting of operations results in undesirable downtime for the cluster. Furthermore, the cost of maintaining a consistent value of N increases non-linearly with more master nodes; clusters larger than 32 master nodes may experience minutes of downtime for all users during node failure. Exacerbating this problem is the fact that as cluster size increases, so does the probability of node failure. As a result, customers shy away from large clusters even though they provide greater computing capacity.

For the afore-mentioned reasons, it is highly desirable to deploy clusters in such a manner that there is zero downtime upon node failure. Therefore, there is a need for techniques to maintain reliability and consistency in a cluster without requiring a cluster-wide synchronization event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for maintaining an item-to-node mapping among a plurality of nodes within a system. According to one embodiment, first data is maintained at a first node indicating the first node's understanding of the system's current state. For example, in a system where the mapping parameter value is the number of currently active master nodes (N), the first data may include state information that indicates, for each master node, the first node's understanding of whether the master node is currently active. The first node may, for example, understand that certain nodes are not active master nodes because the nodes have failed. At the first node, a first item-to-node mapping is determined based on said first data.

Second data is received at the first node from a second node, indicating the second node's understanding of the system's current state. For example, the second data may include state information for each node in the same set of nodes. This second data may, for example, be piggybacked upon messages that are being sent from the second node to the first node for purposes otherwise unrelated to synchronization of item-to-node mapping information.

The state information in the second data indicates, for each master node, the second node's understanding of whether the node is an active master node. If the first data indicates that a particular node is an active master node, while the second data indicates that the particular node is not an active master node, then the first node updates its first data to indicate that the particular node is no longer an active master node. A second item-to-node mapping may then be determined at the first node based on the updated first data. In this manner, the first node discovers the failure of a particular node and adjusts its item-to-node mapping without requiring a cluster-wide synchronization event.

According to one embodiment of the invention, an item-to-master-node mapping is maintained among a plurality of nodes in a system. A first node uses a first item-to-master-node mapping based on the first node's understanding of which nodes within the system are currently active master nodes. The first item-to-master node mapping and the first node's understanding of which nodes are currently active master nodes are out-of-date. They may be out-of-date, for example, because a master node in the system has failed and the first node has yet to learn of the failure. A second node uses a second item-to-master-node mapping based on the second node's understanding of which nodes within the system are currently active master nodes. The second item-to-master-node mapping is not out of date. Both the first item-to-node mapping and the second item-to-node mapping are used concurrently. In this manner, the system continues to operate upon the failure of a node without halting for a synchronization event to agree upon the item-to-master-node mapping.

According to one embodiment, techniques may be employed to avoid conflicting nodes assuming responsibility for the same item (i.e. the split-brain problem). One such technique requires that the mechanism used to produce the item-to-master-node mapping be such that, when a node fails, only the items mapped to the failed node are re-mastered. Thus, a node can safely continue to allow operations upon items it has previously mastered while it re-masters the nodes orphaned by the node failure. A cryptographic hash function is an example of one such mechanism. Another technique for avoiding split-brain is requiring that, before a node can allow operations on an item that has been re-mastered to it, the node must wait for one or more messages indicating that the first item may be safely re-mastered to the node. However, the node may allow operations upon nodes mapped to it that have not been re-mastered.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A-E are block diagrams illustrating the operation of the exemplary system of FIG. 1 according to one embodiment of the invention;

DETAILED DESCRIPTION

Figure 1:
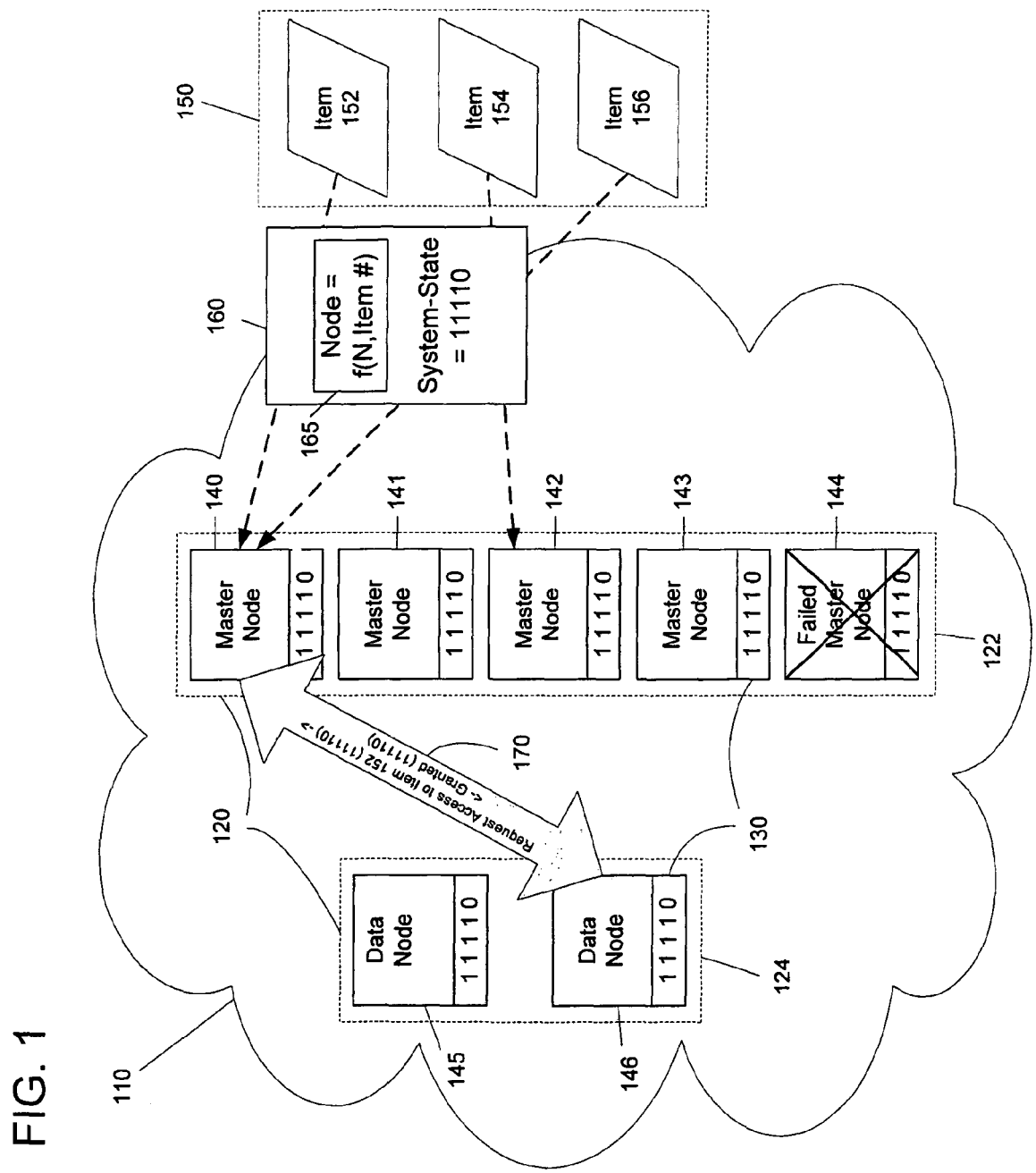
FIG. 1 illustrates an exemplary system in which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described for maintaining an item-to-node mapping among a plurality of nodes in a system. According to one aspect of the invention, each node maintains "locally-stored system-state" information. The locally-stored system-state information of each node represents that node's understanding of those aspects of the system state that determine the mapping parameter values. For example, in a system in which the item-to-node mapping is based on the number of active master nodes in the system, the locally-stored system-state information maintained by a node indicates which master nodes the node believes to be active.

According to one aspect of the invention, instead of acting upon a global item-to-node-mapping, each node determines item-to-node mappings based on its own locally-stored system-state information. Basing item-to-node mapping determinations on locally-stored system-state information guarantees that items are only mapped to nodes that the mapping node believes to be active master nodes. Further, each node is independently capable of determining the master node of any item using its locally-stored system-state information without involving other nodes.

According to another aspect of the invention, the mechanism for establishing an item-to-node mapping is deterministic, given a particular set of mapping parameter values. Consequently, since each node determines its mapping parameter values based on its locally-stored system-state information, all nodes that have the same locally-stored system-state information will map items to the same master nodes. Thus, any two nodes with the same locally-stored system-state information may conduct business as normal.

According to one aspect of the invention, each node employs a node failure detection mechanism. For example, if a first node has not responded to a message from a second node after a predetermined amount of time, then the second node concludes that the first node has failed. The second node updates its locally-stored system-state information to indicate that the first node is no longer an active master node. Because of the update, the item-to-node mapping used by the second node is also updated.

According to one aspect of the invention, nodes send data to each other indicating their locally-stored system-state information. If a node receives data indicating that another node has locally-stored system-state information that differs from the node's own locally-stored system-state information, then the receiving node will unambiguously merge its locally-stored system-state information with the sending node's locally-stored system-state information.

In one embodiment, the unambiguous merger is performed by counting as active, for the new locally-stored system-state information, only those master nodes that both the sender and the recipient consider to be active. Thus, the receiving node arrives at a new locally-stored system-state information indicating that only nodes that both the sending node and the receiving node understood to be active master nodes. As this new locally-stored system-state information is propagated through the system, each node in the system will become aware of node failures, and will adjust their locally-stored system-state information accordingly. Significantly, using this technique, changes to the system-state information are disseminated among any number of nodes with zero-downtime, because there is no cluster-wide synchronization event. Since the mechanism for establishing item-to-node mappings is deterministic and based on the locally-stored system-state information, any node that has discovered the new system-state information will know the new item-to-node mapping for the system.

According to one aspect of the invention, the system may employ a variety of techniques to avoid the split-brain problem that results when two nodes having different locally-stored system-state information operate on the same item. According to one embodiment of the invention, the deterministic mechanism for determining an item-to-node mapping relies upon a strategy in which items are only remapped to another node when the node to which they were formerly mapped fails.

According to one embodiment of the invention, a node must wait for a re-mastering event to occur before assuming responsibility for items that have been remapped to it upon arriving at new locally-stored system-state information. A re-mastering event may comprise, for example, one or more messages from other nodes. The messages from other nodes may indicate that there will be no conflict if the node assumes responsibility for the items. However, even before receiving such messages, the node may continue to perform operations, such as granting access permission, on items mapped to it that have not been remapped under the new locally-stored system-state information.

Exemplary System

Figure 7:
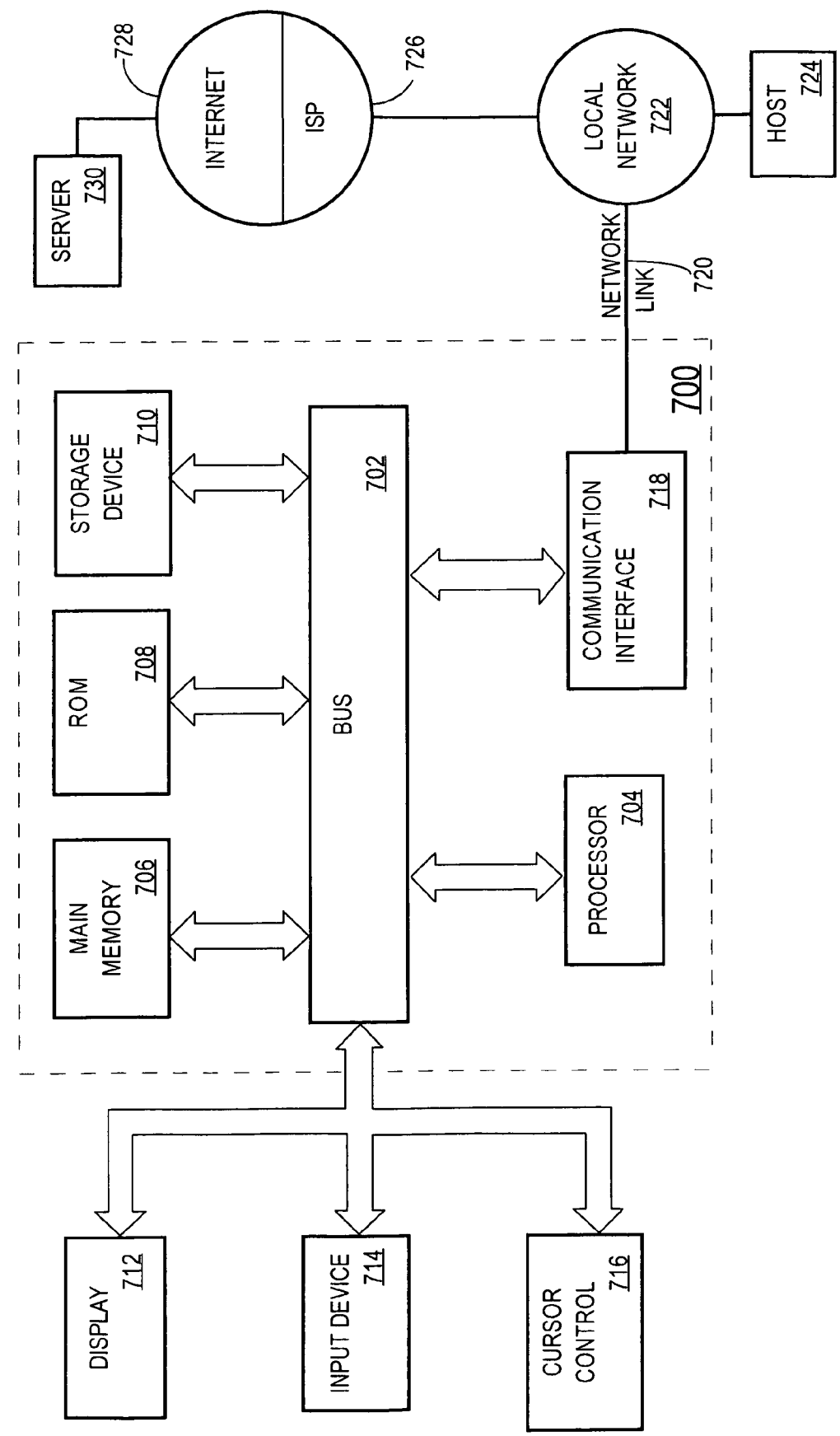
FIG. 7 is a block diagram that illustrates a computer system upon which an embodiment of the invention may be implemented.

FIG. 1 illustrates an exemplary system in which an embodiment of the invention may be implemented. Referring to FIG. 1, it illustrates a cluster 110 that includes nodes 120. Nodes 120 may be any computer system or process running on a computer system, as depicted in FIG. 7 and discussed hereinafter. Cluster 110 may be formed by connecting nodes 120 by any known means, including network links 720, as depicted in FIG. 7 and discussed hereinafter.

Nodes 120 include a set of master nodes 122. In the example illustrated in FIG. 1, each of nodes 140-144 is a master node. Together, the master nodes 122 form a set of nodes to which items 150 may be mapped in cluster 110. Nodes 120 also include data nodes 124. Data nodes 124 are nodes that require access to items 150, but which do not master any of the items 150. Data nodes must first obtain a lock (i.e. be granted access permission to the particular item) before accessing the items they need. For example, nodes 145 and 146 are master nodes 122. Data nodes 124 may obtain a lock on a particular item by means of communications, such as communications 170, with the master node 122 to which the particular item is mapped in item-to-node mapping 160.

Cluster 110 may comprise any number of nodes 120, and nodes 120 may comprise any number of master nodes 122 and data nodes 124. Although cluster 110 depicts data nodes 124 that are separate and distinct from master nodes 122, master nodes 122 may also function as data nodes 124, and some embodiments of the invention may not comprise any separate and distinct data nodes 124.

Each node 120 maintains its own locally-stored system-state information. For the purpose of illustration, it shall be assumed that within cluster 110, the number of active master nodes (N) is the mapping parameter value. Thus, the locally-stored system-state information 130 maintained by each node includes information about how many active master nodes there are in the cluster 110.

In the illustrated embodiment, the locally-stored system-state information 130 of a node indicates the node's understanding of the current state of each master node 122. Specifically, locally-stored system-state information 130 indicates, for each master node 122, whether the particular node understands the master node to be alive, and thus a node to which items 150 are currently mapped in cluster 110.

Bitmap Representation of State Information

The local locally-stored system-state information may be represented and maintained in a variety of ways. According to the embodiment as depicted in FIG. 1, locally-stored system-state information 130 is represented as a bitmap, wherein each master node 122 is represented by a bit. If the bit that corresponds to a master node is set to 1, then the master node 122 is understood to be alive. If the bit is set to 0, then the corresponding master node 122 is understood to have failed. For example, node 146's locally-stored system-state information 130 is represented by the bitmap "11110." Since the bitmap contains five digits, the bitmap indicates that cluster 110 comprises five master nodes 122, meaning there is a set of five nodes in the system to which items 150 may be mapped. Nodes 140 through 143 comprise the first four master nodes 122 of the set, each of which is alive. Thus, the first four digits of the bitmap are "1111." Node 143, the fifth node of the set, has failed and is thus represented by a "0." Thus, the full resulting bitmap is "11110."

Items 150 are shared resources, objects, or other items to which cluster 110 has access. For example, items 152, 154, and 156 are each items 150. Items 150 may be stored on any medium known within the art, including on nodes 120 within cluster 110, or on an external database.

Item-to-Node Mapping

Items 150 are mapped to master nodes 122 by means of item-to-node mapping 160. Item-to-node mapping 160 correlates each item in items 150 to a unique master node 122. Item-to-node mapping 160 may be any mechanism for mapping an item to a unique node that is based upon the locally-stored system-state information. In cluster 110, the mapping parameter value is the number of active master nodes (N). Consequently, item-to-node mapping 160 maps items 150 to master nodes 122 based on N.

Various mechanisms for mapping an item to a unique node will be discussed hereinafter. Hash function 165, which resolves a master node 122 based on a function of the locally-stored system-state information 130 and a unique identification number for the required item, is one such mechanism.

Because each node 120 maintains its own locally-stored system-state information 130, which may sometimes differ from another node's locally-stored system-state information 130, different node 120 may also be using different item-to-node mappings 160. However, any node 120 with the same locally-stored system-state information 130 will also have the same item-to-node mapping 160.

Obtaining a Lock Using the Item-to-Node Mapping

Items 150 may not be accessed by nodes 120 unless the nodes 120 obtain locks on (i.e. permission to access) the items 150. A lock may be obtained by means of communications, such as communication 170, between the requesting node 120 and the master node 122 to which the particular item 150 is mapped. For example, node 146 seeks access to item 152. The item-to-node mapping 160 of node 146 resolves item 152 to master node 140. Node 146 therefore sends a message to node 140 requesting access to item 152, as depicted in communication 170. Master node 140's item-to-node mapping 160 also indicates that master node 140 is the master of item 152, so master node 140 responds with a message granting node 146 access to item 152, as depicted in communication 170.

Merging State Information

According to one embodiment, when a node receives state-information from another node, the receiving node merges the received state-information with its own locally-stored state information. For example, if master node 140's item-to-node mapping 160 indicates that item 152 was not mapped to master node 140, then master node 140 would take steps to determine a "correct" item-to-node mapping 160 by unambiguously merging its locally-stored system-state information 130 with node 146's locally-stored system-state information 130, as shall be discussed hereinafter. If, after determining the "correct" item-to-node mapping 160, master node 140's item-to-node mapping 160 still indicated that item 152 was not mapped to master node 140, then master node 140 responds to node 146 with a message indicating that master node 140 is not the master of item 152.

Piggybacking to Disseminate State Information

To facilitate the determination of the "correct" locally-stored system-state information, a bitmap representation of each node's locally-stored system-state information 130 may be piggybacked upon any communication between nodes, as depicted in communications 170. In fact, according to some embodiments of the invention, data indicating the locally-stored system-state information must be piggybacked upon every message a node sends, allowing a receiving node to always compare its locally-stored system-state information (and, by extension, item-to-node mapping) to that of the sending node before conducting any business with the sending node. Although the piggybacking of a bitmap upon every message has minimal overhead, the transaction costs of such a technique may be reduced even further by compressing the bitmap.

Discovering Node Failures

Figure 2:
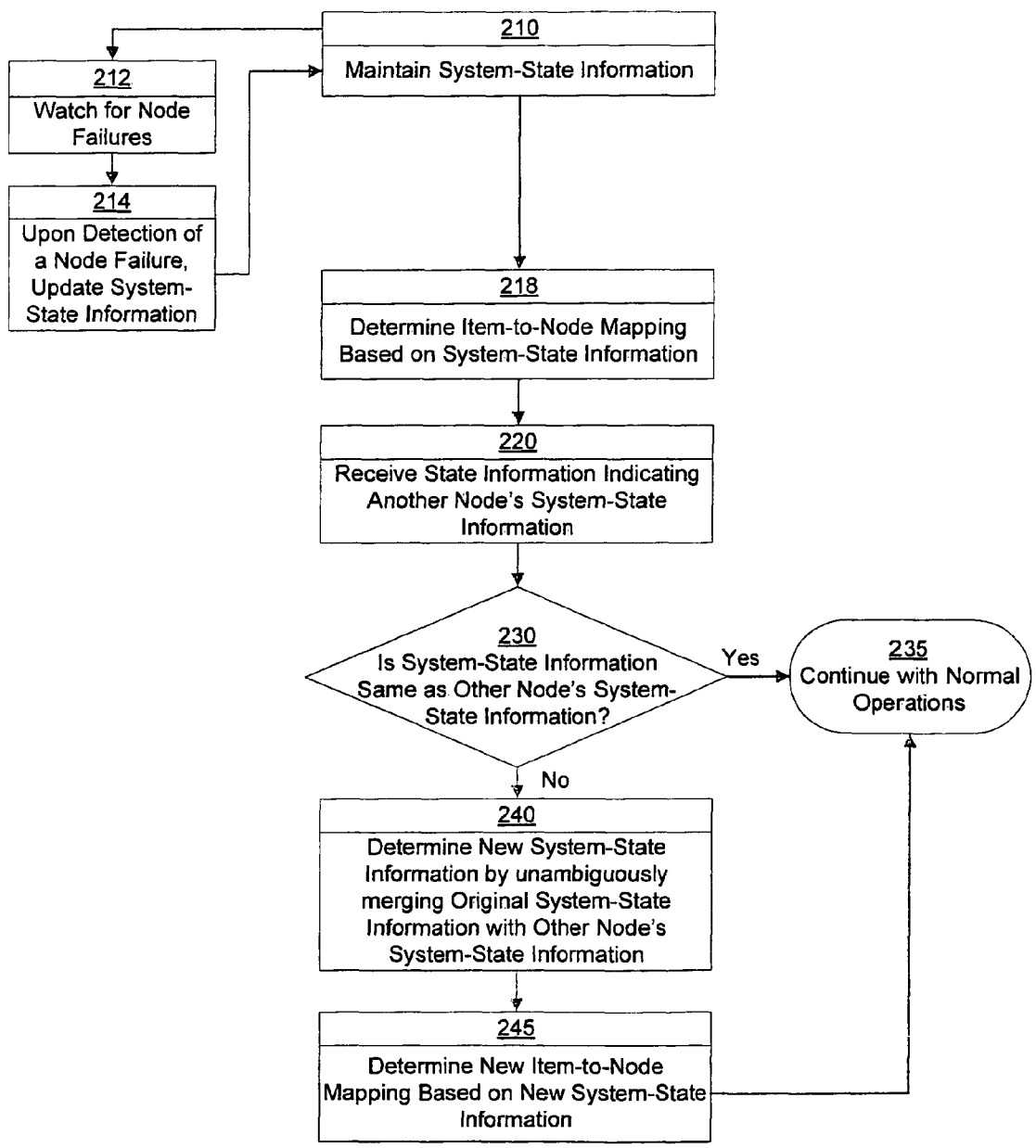
FIG. 2 is a flowchart depicting a method of maintaining an item-to-node mapping on a node within a plurality of nodes in a system according to an embodiment of the invention.

FIG. 2 is a flowchart depicting a method of maintaining an item-to-node mapping on a node within a plurality of nodes in a system, according to an embodiment of the invention.

In step 210 of FIG. 2, a node maintains locally-stored system-state information. As mentioned above, the locally-stored system-state information may be state information describing the node's understanding of which nodes in a set of nodes are active master nodes. The initial set of master nodes is established when the system is initiated. For example, when cluster 110 in FIG. 1 was initiated, it was determined that the set of master nodes 122 included nodes 140-144. A node begins by assuming that all nodes in the initial set of master nodes are nodes to which items are currently mapped. The locally-stored system-state information may be stored in a variety of forms on any medium accessible to the node, including, for example, as a bitmap such as the one depicted by locally-stored system-state information 130 in FIG. 1.

According to one embodiment of the invention, to maintain locally-stored system-state information, each node employs certain proactive measures for detecting node failures directly (in contrast to receiving notice of a node failure from another node, which shall be discussed hereinafter). For example, in step 212 the node watches for node failures. Upon detecting a node failure, in step 214, the node updates its locally-stored system-state information to indicate that the failed node is no longer an active master node.

A node may employ a variety of techniques for detecting node failures. One such technique involves a first node waiting a predetermined time for an expected response to a message sent to a second node. A variation of this technique facilitates more rapid discovery of node failures by requiring that an acknowledgement (ACK) be sent in reply to any sent message. If, after the predetermined amount of time, no response is received, the second node is presumed to have failed. According to step 214, the first node would then update its locally-stored system-state information to indicate that the second node is no longer an active master node.

In step 218, the node determines an item-to-node mapping based on the locally-stored system-state information. The item-to-node mapping describes the correlation of each shared item in the system to a unique node in the previously mentioned set of nodes. For example, item-to-node mapping 160 in FIG. 1 maps each item 150 to a master node 122. To retain consistency within the system, the mechanism for determining an item-to-node mapping must produce the same item-to-node mapping for any node maintaining the same locally-stored system-state information. Thus, the mechanism will be based upon the locally-stored system-state information. Such mechanisms are described in greater detail hereinafter.

Since the node's item-to-node mapping is based on the locally-stored system-state information, the process of updating the locally-stored system-state information in step 214 results in a "correct" item-to-node mapping for the system that no longer maps items to the failed node. However, this item-to-node mapping is local to the node and must now be propagated through the system.

Propagating Node Failures

It contrast to prior art systems, which require a cluster-wide synchronization event to arrive at a "correct" item-to-node mapping upon a node failure, according to one aspect of the invention, node failures are propagated through the system by means of messages sent from one node to another indicating the locally-stored system-state information. Although these messages may be sent synchronously, they may also be sent asynchronously, meaning that not all nodes must update their item-to-node mapping at the same time. For example, messages indicating a new locally-stored system-state information may be sent between nodes on a need-to-know basis, so that a master node does not discover new system-state information until another node requires access to an item which (a) was mapped to the master node, but is no longer so mapped, or (b) that should be mapped to the master node under the most recent item-to-node mapping. Each node must therefore be individually configured to maintain its own item-to-node mapping in such a manner as to be able to update it autonomously upon receiving a message indicating new system-state information.

In step 220, the node receives state information indicating another node's locally-stored system-state information. The state information may be communicated to the node by any means. According to one embodiment, the state information may be encapsulated as a bitmap piggybacked upon a request for access or other message sent from the other node in the ordinary course of events. According to one embodiment, the state information may be delivered as its own separate message in response to the other node discovering a node failure.

In step 230, the node compares its locally-stored system-state information to the received system-state information. If the locally-stored system-state information matches the received system-state information, then, as depicted in step 235, the node may proceed with normal operations. If the state information in step 220 was received as part of a request for access to an item, for example, this may entail granting the other node access to the requested item.

However, if the versions of system-state do not match, then, as depicted in step 240, the node must generate new locally-stored system-state information by unambiguously merging its original locally-stored system-state information with the other node's locally-stored system-state information. The new locally-stored system-state information will only indicate that a node is an active master node when both the original locally-stored system-state information and the other node's locally-stored system-state information so indicate.

For example, in a system where the locally-stored system-state information is represented by a bitmap, if the original locally-stored system-state information is "11110" and the other node's locally-stored system-state information is "11011," the new locally-stored system-state information will be "11010" (which, conveniently, is the result of an AND operation on the two notions). Merging the two versions of system-state information is necessary because the current node may be aware of a failure of which the other node is not aware, while the other node may be aware of a failure of which the current node is not aware.

According to another embodiment, the comparison in step 230 looks to see if the other node's locally-stored system-state information indicates that a node understood by the current node to be an active master node is no longer a node to which items are currently mapped. If this condition is not met, then no updating of the locally-stored system-state information is required, since merging the two notions in step 240 will only produce the original locally-stored system-state information. In other words, if this condition is not met, then the current node has a more up-to-date version of the system-state information. The node may thus safely proceed with step 235.

At step 235, the current node informs the other node of the new system-state information, especially if the other node's outdated locally-stored system-state information has caused the other node to resolve an item to the current node that should not be resolved to the current node under the more recent item-to-node mapping.

In step 245 a new item-to-node mapping is determined based on the new locally-stored system-state information. The mechanism for producing the new item-to-node mapping in step 245 is the same as that of step 218, only a different item-to-node mapping will be produced as a result of a different locally-stored system-state information. After this step, the node may continue with normal operations in step 235.

In this manner, a new item-to-node mapping propagates through the system at the speed at which messages indicating the new locally-stored system-state information are sent to the nodes in the system.

Reconstructing the Namespace

According to one embodiment, cluster 110 includes a mechanism to recover orphaned items (i.e. items that are lost because they are no longer mapped to an active node). Such a mechanism may employ a technique that is referred to herein as "reconstructing the namespace". This technique requires that, after a node changes its locally-stored system-state information, the node scrub its local cache to identify items that have been orphaned as a result of node failures evidenced in the new locally-stored system-state information. Once identified, a node should list the identified items by the node to which they should now be mapped, and send each list to the corresponding node. When a node receives such a list, the node may reconstruct the metadata (e.g. the locking state) for the listed items by accessing the items directly. Alternatively, each node sending such a list may also send the metadata for each item in the list.

The system may also employ data redundancy or backup mechanisms to preserve data that resided on the failed node itself.

According to a variation of the above described embodiment, the mechanism for reconstructing a namespace further comprises the node scrubbing its local cache for items that have been remapped under the new item-to-node mapping. These items are also organized into lists and sent respectively to the new nodes to which they are mapped.

According to one embodiment, immediately after assuming responsibility for an item whose item-to-node mapping has changed, and before allowing any operations on the item, a node must construct metadata for the item, such as the current lock state of the item. The metadata for an item may be constructed by examining the item itself, by interpreting data sent to the node as part of a namespace reconstruction or similar mechanism, or by any other known means.

Adding New Nodes

According to one embodiment of the invention, data nodes (i.e. nodes to which items may not be mapped) may be added to a system at any time. However, master nodes (i.e. nodes to which items may be mapped) may only be added when the system is initialized. Once a node has failed, it may not return to the system as a node to which items may be mapped, because it would not be clear, when merging locally-stored system-state information, whether the node had previously failed and was presently returning to the system, or whether the node had previously been alive and recently failed. A failed master node may physically return to the system as a data node, however, the system will logically consider it to be an entirely new node.

According to one embodiment of the invention, the system may be periodically re-initiated to restore master nodes to the system. For example, it may be periodically re-initiated every morning at 2:00 AM, when demands on the system are low.

According to another embodiment, the addition of nodes may be facilitated by formulating the locally-stored system-state information in such a manner that the state information makes it clear whether the node had previously failed and was presently returning to the system, or whether the node had previously been alive and recently failed. For example, the state information might keep track of incarnation numbers for each node, or of failure and startup times for each node. A new master node would announce itself to one or more nodes when coming online, and the node addition would propagate through the system in the same manner as discussed for node failures.

According to another embodiment, the addition of new nodes is facilitated by expanding the set of nodes to which items may be mapped in the system. For example, a bitmap representation of the locally-stored system-state information might be expanded to six digits instead of five to account for the addition of a new node. To avoid confusion over the change in bitmap size, the bitmap could further comprise a tag indicating the length of the bitmap. Failed master nodes could then physically return to the system, albeit logically regarded as new master nodes. A new master node would announce itself to one or more nodes when coming online, and the node addition would propagate through the system in the same manner as discussed for node failures.

Avoiding Split-Brain

According to one aspect of the invention, a node may only perform an operation on an item if its item-to-node mapping indicates that the item is currently mapped to the node. It must otherwise refuse to perform the operation and inform the requesting node of its locally-stored system-state information. Since an item-to-node mapping may only map an item to one unique node, the problem of split-brain, as discussed previously, exists only when two or more nodes have different item-to-node mappings as a result of having different locally-stored system-state information. Specifically, the problem occurs only when different item-to-node mappings resolve an item to different nodes. Because these conditions may exist, albeit briefly, in the node failure propagation strategy discussed above, an embodiment of the invention should employ a technique to avoid the split-brain problem.

According to one embodiment of the invention, the technique for avoiding split-brain involves using an item-to-node mapping function that only remaps items that map to failed nodes. Such functions are referred to herein as "safe-remapping functions". Using a safe-remapping function guarantees that lock requests will only be sent to (1) the correct active master nodes, or (2) fail nodes. Put another way, safe-remapping functions guarantee that lock requests will never be sent to active nodes that are not the correct masters.

Various item-to-node mapping functions qualify as safe-remapping functions. A trivial example of a safe-remapping function involves the use of an N−1 strategy, wherein if an item would be mapped to node N, but node N has failed, then item is instead mapped to node N−1. If N−1 has also failed, then the remapping is to N−2, etc. Other, more optimal safe-remapping functions shall be discussed hereafter.

Using a safe-remapping function avoids the split-brain problem because it ensures that, even when outdated mapping parameter values are used, lock requests are never sent to active nodes that are not the correct master. Since a failed node cannot perform any operations whatsoever, there is no potential for conflict of ownership.

Remastering in Response to Remastering Events

Figure 3:
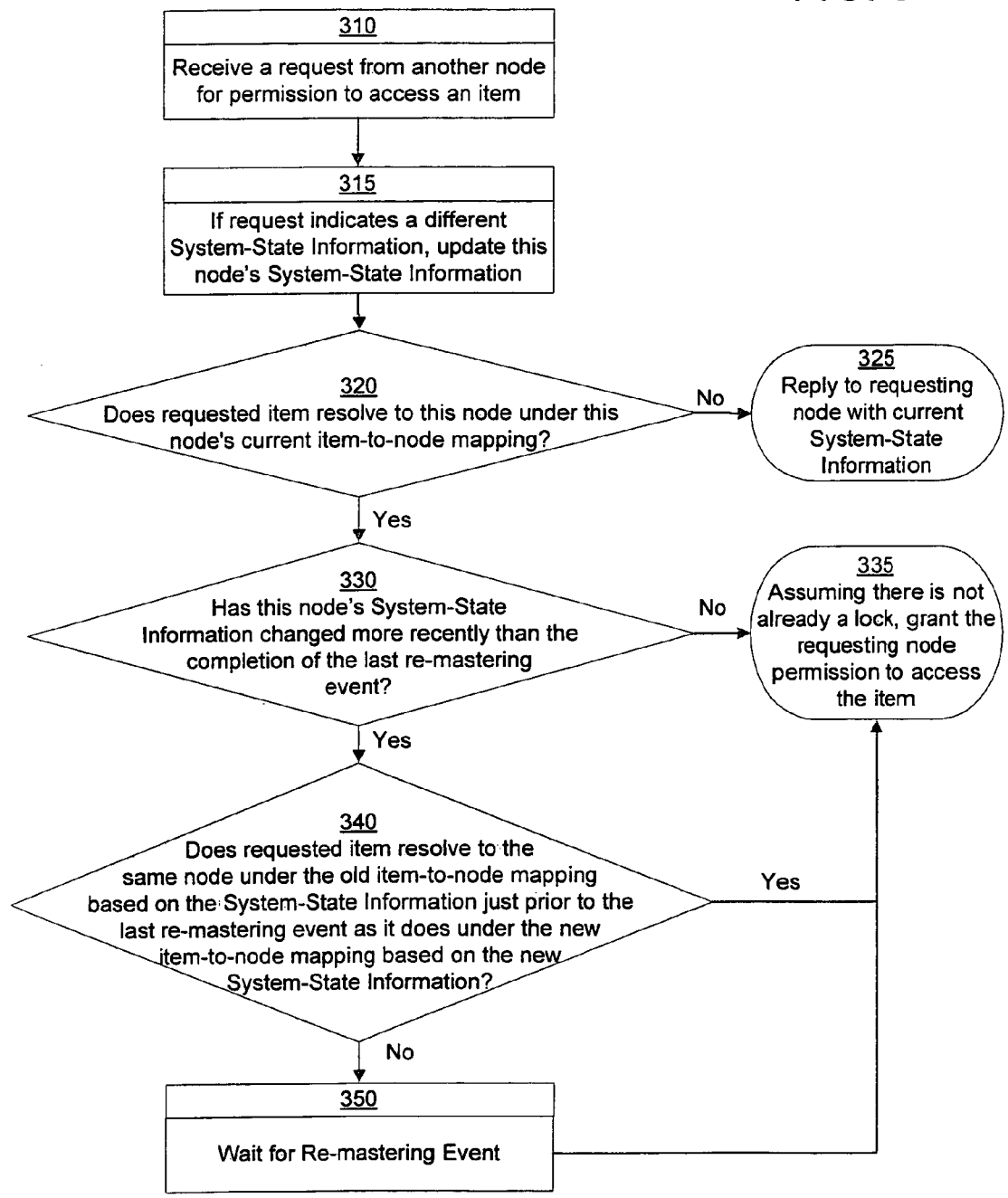
FIG. 3 is a flowchart depicting a technique for avoiding split-brain in a system wherein different nodes have different mapping parameter values, according to one embodiment of the invention.

FIG. 3 is a flowchart depicting a technique for avoiding split-brain in a system wherein different nodes have different locally-stored system-state information, according to one embodiment of the invention. The technique involves having nodes wait for a re-mastering event to occur before assuming responsibility for items that have been remapped to them. However, the nodes may continue to perform operations, such as granting access permission, on items that were previously mapped to them.

In step 310, a node receives a request from another node for permission to access an item. In step 315, if the request comprises state information indicating a different system-state, the node updates its own locally-stored system-state information using a technique such as outlined in FIG. 2.

The technique illustrated in FIG. 3 does not assume that a safe-remapping function is being used. Therefore, it is possible for an active node to receive a lock request for an item that it no longer masters. To address this situation, in step 320, the node checks to see if the requested item resolves to the node under the node's current item-to-node mapping. If not, as depicted in step 325, the node replies to the requesting node with its current locally-stored system-state information, thus allowing the requesting node to independently determine the node to which the requested item should map and request it from that node. Otherwise, the node proceeds to step 330.

In step 330, the node checks to see if its locally-stored system-state information has changed more recently than the completion of the last re-mastering event. This step presupposes that the node has been maintaining data that indicates not only prior locally-stored system-state information, but when the locally-stored system-state information changed, and when the last re-mastering event occurred. If the last re-mastering event occurred more recently than the last change in the locally-stored system-state information, and assuming there is not already a lock on the requested item, the node may safely grant the requesting node permission to access the item, as depicted in step 335. This step avoids the split-brain problem because the fact that the locally-stored system-state information has not changed since the last re-mastering event occurred guarantees that no other node may assume responsibility for any items that currently map to the node. Otherwise, the node proceeds to step 340.

In step 340, the node checks to see if the item resolves to the same node under the old item-to-node mapping based on the locally-stored system-state information just prior to the last re-mastering event as it does under the new item-to-node mapping based on the new locally-stored system-state information. If so, assuming there is not already a lock on the requested item, the node may safely grant the requesting node permission to access the item, as depicted in step 335. This avoids the split-brain problem because if an item continues to resolve to the same node after a change in the locally-stored system-state information, no other node under either locally-stored system-state information can have an item-to-node mapping that resolves the item differently. Furthermore, if another node were to operate under yet a third locally-stored system-state information, the other node would first require a re-mastering event to occur before assuming responsibility for the item. Such a re-mastering event cannot yet have occurred because it would, as shall be discussed shortly hereinafter, require that the current node also become aware of the third locally-stored system-state information.

If the item resolves to a different node under the old item-to-node mapping based on the locally-stored system-state information just prior to the last re-mastering event than it would under the new item-to-node mapping based on the new locally-stored system-state information, the current node proceeds to step 350. In step 350, the node waits for a re-mastering event to occur. When the node deems the re-mastering event to have occurred, it then proceeds to step 335. The re-mastering event may occur at any time, including before the current node changes its locally-stored system-state information, or before, during, or after any of the steps outlined in FIG. 3.

A re-mastering event may comprise, for example, receiving one or more messages from other nodes interpreted by the current node to mean that there will be no conflict if it assumes responsibility for the items. According to one embodiment, the node may deem the re-mastering event to occur once it receives a message from each master node in the cluster confirming the new locally-stored system-state information. A variation of this embodiment requires that each master node send a list of items to be re-mastered to the current node before the re-mastering event may be deemed to have occurred.

According to another embodiment, a re-mastering event is deemed to have occurred after the completion of a mechanism similar to the namespace reconstruction mechanism described previously. Each node in the cluster scrubs its local cache to find all items whose masters have changed due to the change in the mapping parameter value. Each node then organizes the set of items to be re-mastered by their new master node, and for every active master node in its new mapping parameter value, sends the list of objects requiring re-mastering to their respective new master (even if the list may be empty). When the current node receives a message from each node in the cluster, the re-mastering event is said to have occurred.

Waiting for a re-mastering event overcomes the split-brain problem by assuring a node assuming responsibility for re-mastered items that all nodes that could have assumed responsibility for the re-mastered items under previous locally-stored system-state information no longer operate under previous locally-stored system-state information. While the above-described embodiments essentially require a cluster-wide event (at least among the master nodes) the event itself is not synchronized (i.e. one node can deem it to have happened before another node), and the event does not require halting operations for items that do not require remapping.

According to one embodiment, the node may deem the re-mastering event to have occurred on an item-by-item basis. Under such an embodiment, the re-mastering event is deemed to have occurred for any single item upon receiving a message from the node to which the item was previously mapped confirming that the current node may safely assume responsibility for the item. The received message may specifically identify the item or items that may be re-mastered, or the received message may generally state that the current node now has responsibility for any items now mapped to it that were mapped to the receiving node under certain locally-stored system-state information. For items previously mapped to a now failed node, the re-mastering event is deemed to have occurred automatically when the node confirms that the failed node has indeed failed. For embodiments where failed master nodes may not logically return to the system, no confirmation of node failure is necessary.

According to one embodiment, step 350 may further comprise the sending of messages soliciting the participation of one or more other nodes, so as to facilitate a more rapid re-mastering event.

The split-brain problem may be overcome by variations on the above described techniques, including a different ordering of steps, the addition or omission of certain steps, or by other techniques that are known within the art.

Illustrative Example

Figure 4A:
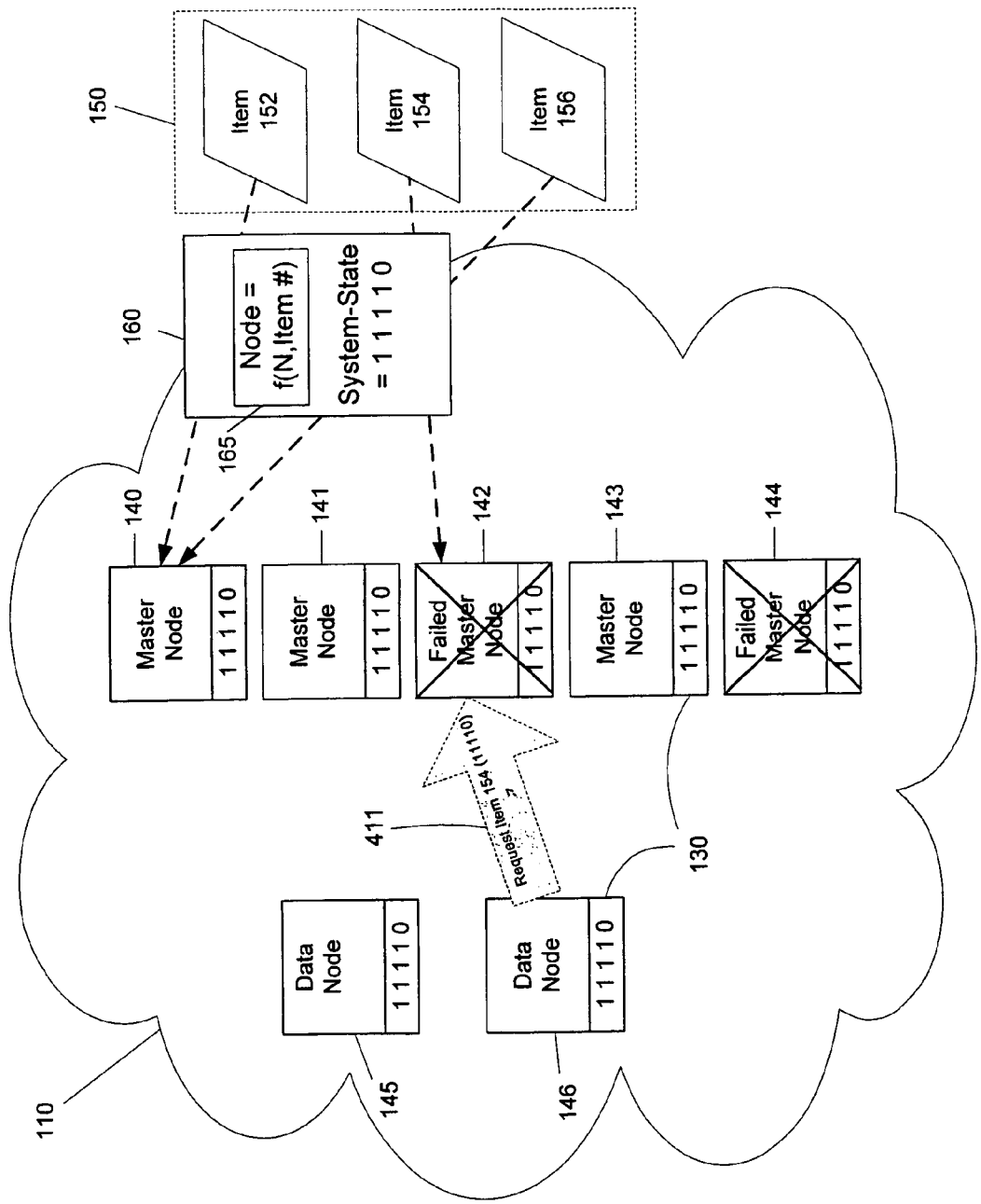

FIGS. 4A-E are block diagrams illustrating the operation of the exemplary system of FIG. 1 according to one embodiment of the invention. In FIG. 4A, data node 146 requires access to item 154. Using item-to-node mapping 160, which is based on data node 146's current locally-stored system-state information 130 ("11110"), data node 146 resolves item 154 to master node 142. It then sends message 411 to master node 142. Message 411 comprises data indicating the request for access as well as data indicating data node 146's locally-stored system-state information 130.

However, since master node 142 has failed, data node 146 does not receive a response to its request. After waiting a predetermined amount of time for a response, data node 146 concludes that master node 142 has failed and is thus no longer a node to which items are currently mapped in cluster 110.

Figure 4B:
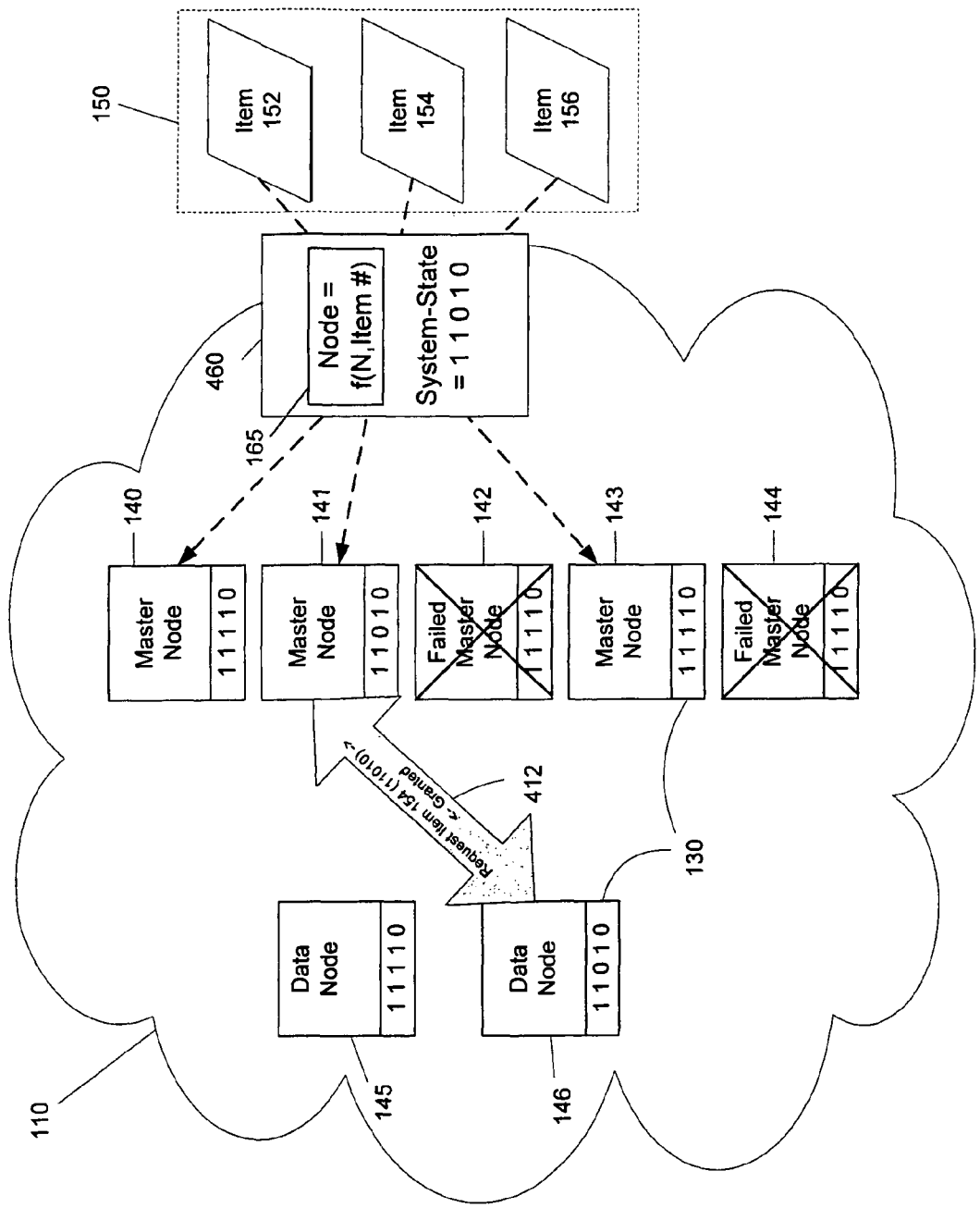

In FIG. 4B, data node 146 has updated its locally-stored system-state information 130 to reflect the failure of master node 142. Because master node was the third node in the set of master nodes 122, the third digit of its bitmap representation of the locally-stored system-state information 130 is now a zero ("11010"). Because of this new locally-stored system-state information 130, data node 146 determines a new item-to-node mapping 460, which resolves item 154 to master node 141.

In communication 412, data node 146 sends data to master node 141 indicating the request for permission to access item 154, accompanied by data indicating its new locally-stored system-state information 130. Upon receiving communication 412, master node 141 realizes that its locally-stored system-state information 130 is not the same as the locally-stored system-state information 130 reflected in the communication 412. Unambiguously merging the two notions, master node 141 determines a new locally-stored system-state information 130 ("11010"), which in this case matches data node 146's locally-stored system-state information 130.

Since all nodes 122 in cluster 110 use the same deterministic mechanism 165 for determining an item-to-node mapping, master node 141 determines the same item-to-node mapping 460 as did data node 146. Under item-to-node mapping 460, item 154 is mapped to master node 141. Because the master node 122 to which item 154 was previously mapped has failed, master node 141 safely assumes responsibility for item 154. After taking measures to determine that no other node has a lock on item 154, it replies to data node 146 in communication 412 with data indicating that permission to access item 154 has been granted.

Figure 4C:
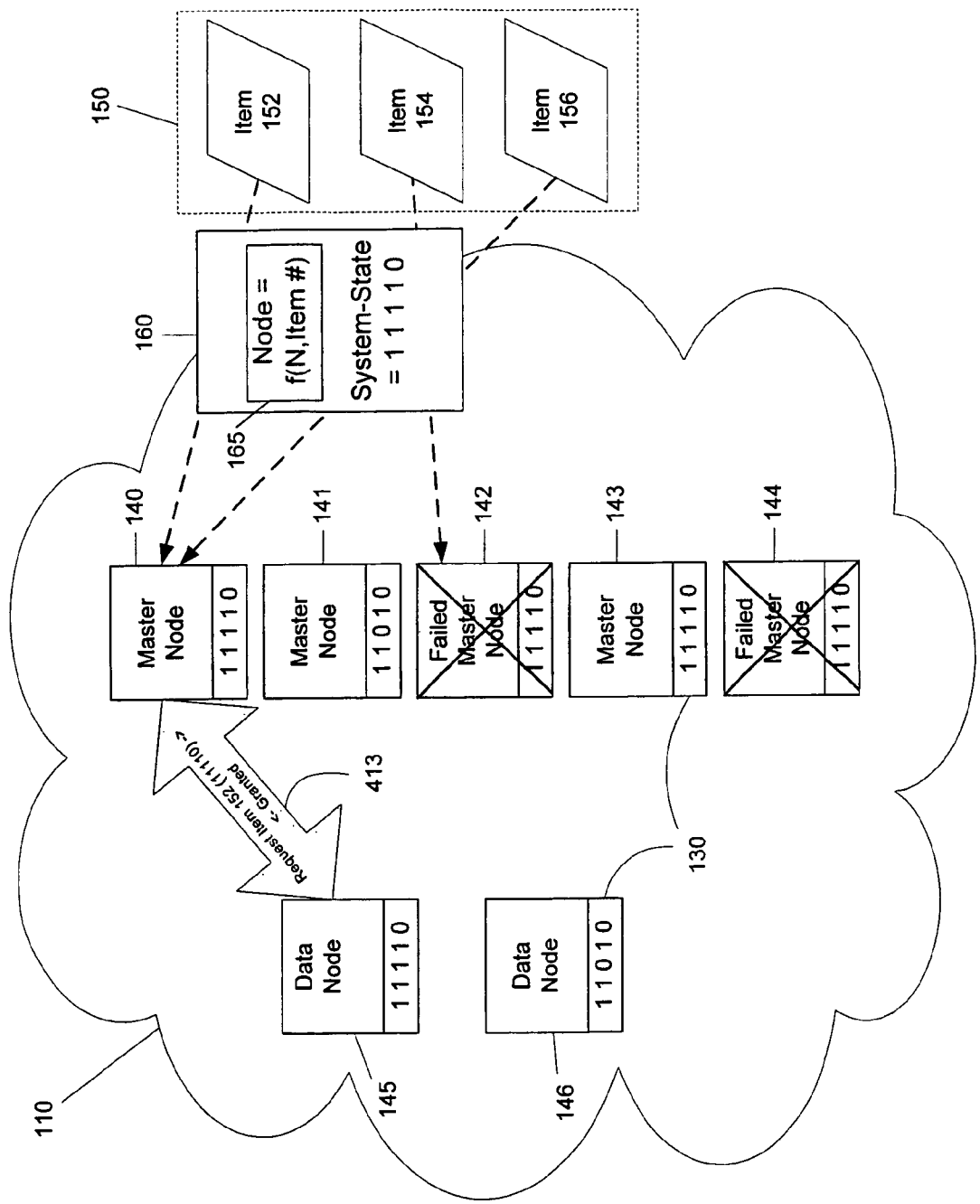

In FIG. 4C, data node 145 requires permission to access item 152. Because its locally-stored system-state information 130 is still "11110," it resolves item 152 to master node 140 under item-to-node mapping 160. It then sends data indicating the request for access as well as data indicating data node 145's locally-stored system-state information 130 to master node 140 via communication 413.

Upon receiving the data from data node 145, master node 140 confirms that its locally-stored system-state information 130 matches that of the requesting node. Because the two notions match, master node 140 may safely proceed with operations as normal. Since master node 140 also understands item 152 to be mapped to master node 140, master node 140 may safely grant access to item 152 (assuming that its metadata indicates no other locks on item 154). Master node 140 responds via communication 413 with data indicating that permission to access item 152 has been granted.

The events of FIG. 4B may occur at the same time as the events of FIG. 4C. Taken together, then, FIGS. 4B-C illustrate that, according to one aspect of the invention, two different nodes with two different versions of locally-stored system-state information may operate concurrently using two different item-to-node mappings.

In FIG. 4D, data node 146 requires permission to access item 156. Because its locally-stored system-state information 130 is "11010," it resolves item 156 to master node 140 under item-to-node mapping 460. It then sends data indicating the request for access as well as data indicating data node 146's locally-stored system-state information 130 via communication 414. Upon receiving communication 414, master node 140 realizes that its locally-stored system-state information 130 is not the same as the locally-stored system-state information 130 reflected in the communication 414. Unambiguously merging the two notions, master node 140 generates new locally-stored system-state information 130 ("11010"), which in this case matches data node 146's locally-stored system-state information 130.

Since all nodes 122 in cluster 10 use the same deterministic mechanism 165 for determining an item-to-node mapping, master node 140 determines the same item-to-node mapping 460 as did data node 146. Under item-to-node mapping 460, item 156 is mapped to master node 140. Because master node 140 was the same node to which item 156 was previously mapped under item-to-node mapping 160, master node 140 already has assumed responsibility for item 156 and need take no additional measures to avoid split-brain. Assuming no other node has a lock on item 156, master node 140 replies to data node 146 in communication 414 with data indicating that permission to access item 156 has been granted.

Figure 4E:
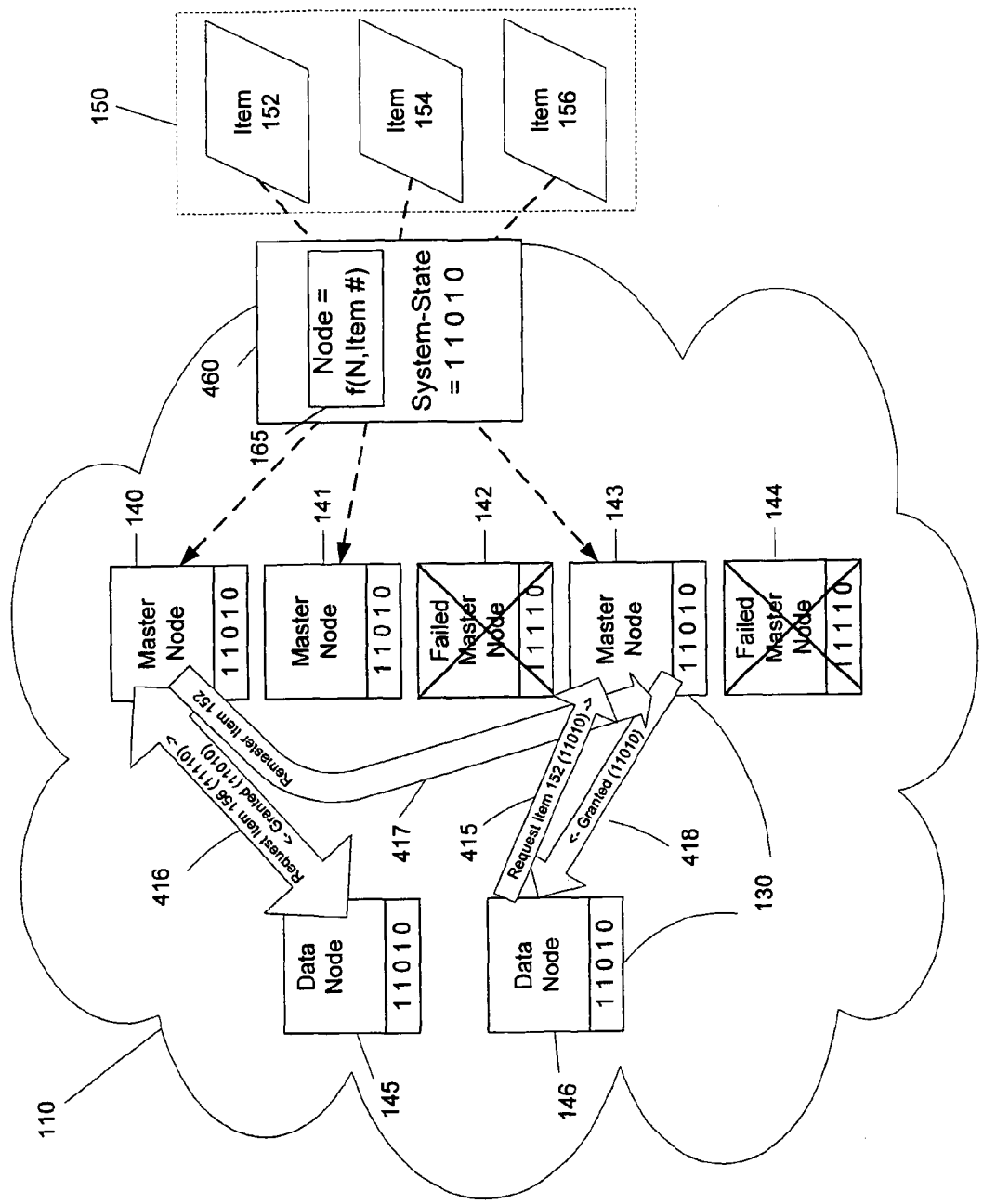

In FIG. 4E, data node 146 requires access to item 152. Using item-to-node mapping 460, which is based on data node 146's current locally-stored system-state information 130 ("11010"), data node 146 resolves item 152 to master node 143. It then sends message 415 to master node 143. Message 415 comprises data indicating the request for access as well as data indicating data node 146's locally-stored system-state information 130.

Upon receiving message 415, master node 143 realizes that its locally-stored system-state information 130 is not the same as the locally-stored system-state information 130 reflected in message 415. Unambiguously merging the two notions, master node 143 determines a new locally-stored system-state information 130 ("11010"), which in this case matches data node 146's locally-stored system-state information 130. However, because item 152 was previously mapped to master node 140 under item-to-node mapping 160, master node 143 must wait for a re-mastering event before performing any operations on item 152.

In the meantime, data node 145 requires permission to access item 156. Because its locally-stored system-state information 130 is still "11110," it resolves item 156 to master node 140 under item-to-node mapping 160. It then sends data indicating the request for access as well as data indicating data node 145's locally-stored system-state information 130 via communication 416.

Upon receiving the data from data node 145, master node 140 determines that its locally-stored system-state information 130 is more recent than that of data node 145. Nonetheless, since item 156 is still mapped to master node 140 under item-to-node mapping 460, master node 140 may safely proceed to grant data node 145 permission to access item 156 (assuming there are no other locks on item 156). In communication 416, master node 140 sends data to data node 145 indicating that permission to access item 156 has been granted.

In communication 416, master node 140 also sends data to node 145 indicating its locally-stored system-state information 130. Upon receiving communication 416, data node 145 realizes that its locally-stored system-state information 130 is not the same as the locally-stored system-state information 130 reflected in communication 416. Unambiguously merging the two notions, data node 145 determines a new locally-stored system-state information 130 ("11010"), which in this case matches master node 140's locally-stored system-state information 130. Thus, the new locally-stored system-state information 130 has finally been propagated to all non-failed nodes 120 in cluster 110.

In the meantime, master node 140 sends message 417 to master node 143 with data indicating that item 152 should be re-mastered to master node 143. In the depicted embodiment, this message qualifies as a re-mastering event as to item 152. Assuming no other node has a lock on item 152, master node 143 may now safely grant data node 146 access to item 152. Master node 143 sends message 418 to data node 146 with data indicating that access has been granted.

Good Samaritan Message

Figure 5:
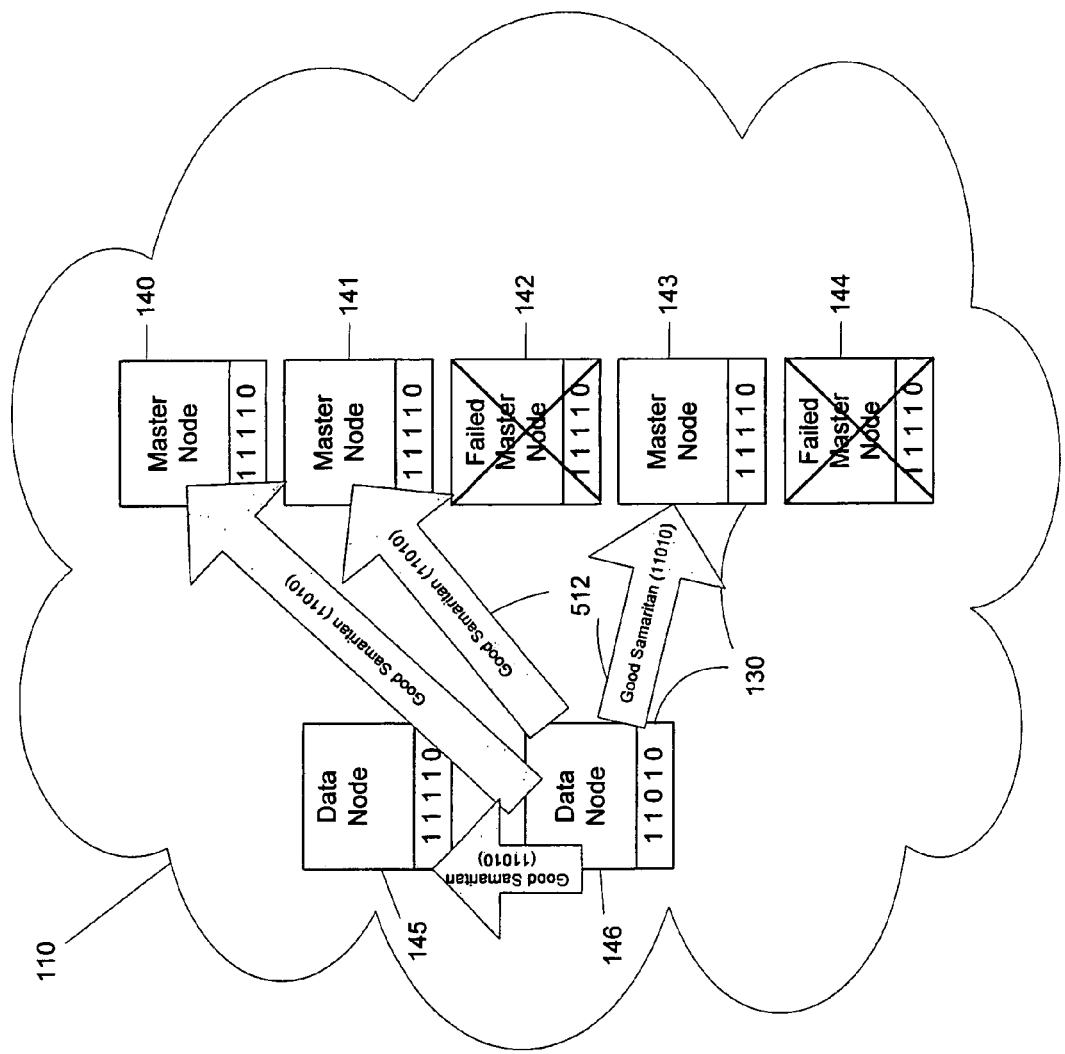
FIG. 5 is a block diagram illustrating an optional optimization technique according to one embodiment of the invention.

FIG. 5 is a block diagram illustrating an optional optimization technique according to one embodiment of the invention. This technique speeds up the process of propagating node failures by requiring that a node that has discovered the failure of another node send "Good Samaritan" messages to each node in the system indicating the new locally-stored system-state information.

For example, in the depicted embodiment, data node 146 has discovered the failure of master node 142. Upon updating its locally-stored system-state information 130 to "11010," data node 146 proceeds to send messages 512 to each active node 120 in cluster 110 with data indicating the new locally-stored system-state information 130.

Mechanisms for Establishing an Item-to-Node Mapping

The mechanism for establishing an item-to-node mapping may be any mechanism that (a) resolves each shared item to one unique node and (b) uses mapping parameter value(s) that are derived from the locally-stored system-state information. Many mechanisms for establishing an item-to-node mapping are possible. For example, any hash function or table may be used. These mechanisms typically use, as the mapping parameter value, the number (N) of active master nodes. Since N is discernible at any time from the locally-stored system-state information, these mechanisms satisfy the condition of using mapping parameter value(s) that are derived from the locally-stored system-state information. Other mechanisms that employ the locally-stored system-state information in different manners may also be used.

The mechanisms described below represent just a few of the many mechanisms that may be used. They are provided by way of example and not by way of limitation. In each of the embodiments described below, it is assumed that each item has been assigned a unique identification number (ID).

According to one embodiment, a simple hash function based on the MOD operation may be used. The function ID MOD N is used to resolve a node. For example, if the item ID is 152 and N is 4, the item is mapped to node 0 (the first still active node in the set of nodes to which items may be mapped). If a node were to fail, thereby making N equal to 3, item 152 would then be mapped to node 2 (the third still active node in the set of nodes to which items may be mapped).

A mechanism that uses a MOD-based hash function is one of the simplest mechanisms, and possesses the additional desirable quality of load-balancing items equally across master nodes. However, it is less than optimal because of its tendency to remap a large number of items upon node failure, and thus freeze the remapped items while their new master nodes wait for re-mastering events. More optimal hashing functions will be tailored both for load-balancing and minimizing the remapping of items.

As mentioned above, certain benefits result from using a safe-remapping function (i.e. a function that only remaps an item when the locally-stored system-state information indicates that the node to which the item would otherwise be mapped has failed). Safe-remapping functions are particularly desirable because, as indicated previously, safe-remapping functions avoid the split-brain problem for systems to which no new master nodes may be added.

A safe-remapping function results from using the N−1 strategy, described above. The N−1 strategy may use any hash function to determine an initial item-to-node mapping. However, once a node fails, if an item would have been mapped to the failed node in the initial item-to-node mapping, the item is instead mapped to node N−1. For example, if node 10 were to fail, all items once mapped to node 10 would be remapped to node 9. If node 9 were then to fail, all items once mapped to node 9 (including those previously mapped to node 10) would be mapped to node 8. This strategy, however, is less than optimal because it does not load balance the items after a failure. In the example just given, node 8 would be responsible for three times more items than any other node.

A more optimal variation of the N−1 strategy hashes items to a large number of buckets, and then hashes the buckets to nodes. If a node fails, a bucket would be remapped to the same node as the previous bucket, which, if the hash function is carefully chosen, is equally likely to be any node to which items may be mapped.

Figure 6:
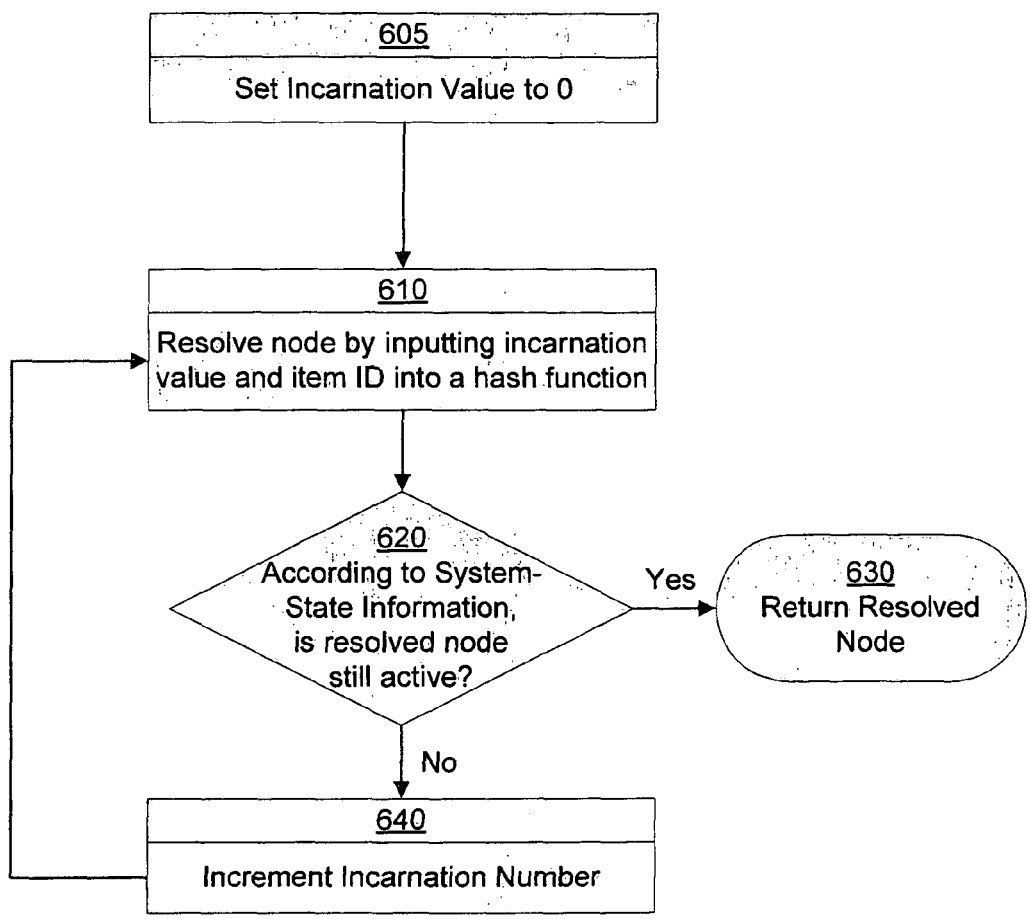
FIG. 6 is a flowchart illustrating the operation of a cryptographic hash function according to one embodiment of the invention.

A cryptographic hash function is another example of safe-remapping function. FIG. 6 is a flowchart illustrating the operation of a cryptographic hash function according to one embodiment of the invention. In step 605 an incarnation value is set to 0. In step 610, an item identifier and the incarnation value are inputted into a hash function and a node is resolved. The hash function may be any predetermined hash function, though a load-balancing hash function is desirable. Rather than being based on the current value of N, the hash function is based on a function of the original value of N at the time the cluster was initiated (n). For any given incarnation value i, the hash-function is based on the value n-i, meaning that an item may be resolved to n-i nodes. For example, with an incarnation value of 0, the hash function may resolve to any master node that was alive when the cluster was initiated. As the incarnation value increases, the hash function may resolve to fewer and fewer nodes, mirroring the decreasing availability of nodes upon node failure.

In step 620, the resolved node is compared to the locally-stored system-state information in order to determine if the resolved node is an active master node. If so, then in step 630 the resolved node is returned as the output of the cryptographic hash function. If not, then in step 640 the incarnation value is incremented, and steps 610 through 630 are repeated.

The cryptographic hash function may be further optimized by maintaining metadata that indicates the current incarnation value for an item.

The cryptographic hash function is both load-balancing and avoids remapping because it possesses what is known as the random oracle property. That is, when a random oracle is given a query x it does the following: 1) if the oracle has been given the query x before, it responds with the same value it gave the last time; 2) if the oracle has not been given the query x before, it generates a random response which has uniform probability of being chosen from anywhere in the oracle's output domain.

Hardware Overview

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for maintaining an item-to-node mapping among multiple nodes in a multi-node system, comprising the computer-implemented steps of:

maintaining, at a first node, first data indicating state information for each master node in a plurality of master nodes;

wherein the state information in the first data indicates, for each master node in said plurality of master nodes, the first node's understanding of whether said each master node is an active node;

determining, at the first node, a first item-to-node mapping based on said first data;

receiving, at the first node from a second node, second data indicating state information for each master node in said plurality of master nodes;

wherein the state information in the second data indicates, for each master node in said plurality of master nodes, the second node's understanding of whether said each master node is an active node;

wherein the first data indicates that a particular node, other than the first node, is an active master node;

wherein the second data indicates that said particular node is not an active master node;

in response to receiving the second data, the first node updating the first data to generate updated first data that indicates that said particular node is no longer an active master node; and after updating said first data, the first node determining a second item-to-node mapping based on said updated first data;

wherein the method is performed by one or more computing devices.

2. The method of claim 1 wherein:
the step of receiving the second data includes the first node receiving a message from the second node relating to a request for permission to access an item, and
the second data is piggybacked on said message.

3. The method of claim 1 wherein:
the first item-to-node mapping maps a particular set of items to said particular node; and
the second item-to-node mapping maps each item that does not belong to said particular set of items to the same node as the first item-to-node mapping.

4. The method of claim 3 wherein the step of determining a first item-to-node mapping includes:
(a) inputting an item identifier and a first incarnation value into a hash function to produce a hash value that maps to a node;
(b) based on the first data, determining whether the node to which the hash value maps is an active master node;
(c) if the node to which the hash value maps is not an active master node, then changing said incarnation value and repeating steps (a)(b) and (c) until the hash value maps to an active master node.

5. The method of claim 1 further comprising the steps of, prior to the first node receiving the second data:
the second node sending a request to a third node for permission to access an item;
the second node waiting a predetermined amount of time for a response from the third node indicating whether access is granted; and
the second node sending the second data in response to not receiving said response within said predetermined amount of time.

6. The method of claim 5 further comprising the second node sending the second data to all active nodes in the system.

7. The method of claim 1 further comprising the steps of:
identifying, at the first node, at least one item in the first item-to-node mapping mapped to said particular node, wherein the first node has permission to access said item;
identifying a new node to which said item is mapped in the second item-to-node mapping; and sending third data to said new node indicating that the first node has permission to access said item.

8. The method of claim 1 wherein the system comprises at least one node to which items are not currently mapped in the system.

9. The method of claim 1 wherein:
the first data is in the form of an ordered bitmap, wherein the state information for each node that has at any time been an active master node is represented by a binary digit; and
the second data is in the form of an ordered bitmap, wherein the state information for each node that has at any time been an active master node is represented by a binary digit.

10. The method of claim 1 further comprising the step of the first node assuming ownership of a set of items;
wherein the first item-to-node mapping maps each item in the set of items to a node other than the first node; and
wherein the second item-to-node mapping maps each item in the set of items to the first node.

11. The method of claim 10 further comprising the step of, prior to assuming ownership of the set of items, the first node granting another node permission to access a particular item, wherein the particular item does not belong to the set of items.

12. The method of claim 1 further comprising the steps of:
identifying, at the first node, at least one particular item in the first item-to-node mapping mapped to said first node that is mapped to a new node in the second item-to-node mapping; and
sending third data to said new node indicating that the first node now understands the particular item to be mapped to the first node.

13. The method of claim 1 further comprising the steps of:
receiving, at the first node, a request from a third node for a first item;
wherein the first item-to-node mapping maps the first item to a fourth node;
wherein the second item-to-node mapping maps the first item to the first node;
receiving, at the first node, third data indicating that the first item may be remastered to the first node,
upon receiving third data, the first node granting the third node permission to access the first item.

14. The method of claim 13 wherein the third data comprises data from the fourth node indicating that the fourth node now understands the first item to be mapped to the first node.

15. The method of claim 13 wherein the third data comprises data from each particular node in the plurality of nodes indicating the items cached at the particular node that should be re-mastered to the first node.

16. The method of claim 13 further comprising the steps of:
receiving, at the first node, a request from a fifth node for a second item;
wherein the first item-to-node mapping maps the first item to the first node;
wherein the second item-to-node mapping maps the first item to the first node; and
the first node granting the fifth node permission to access the second item;
wherein the granting of access to the second item occurs prior to receiving third data.

17. A computer-implemented method for maintaining an item-to-master-node mapping among a plurality of nodes in a system, comprising the computer-implemented steps of:

using a first item-to-master-node mapping at a first node based on the first node's understanding of which master nodes of a plurality of master nodes within the system are currently active nodes;

using a second item-to-master-node mapping at a second node based on the second node's understanding of which master nodes of a plurality of master nodes within the system are currently active nodes;

wherein the first node's understanding of which nodes are currently active master nodes and the first item-master-node mapping are out-of-date;

wherein the second node's understanding of which nodes are currently active master nodes and the second item-master-node mapping are not out-of-date; and wherein the first node uses the first item-to-master-node mapping concurrently with the second node using the second item-to-master-node mapping;

wherein the method is performed by one or more computing devices.

18. The method of claim 17 wherein:
the first item-to-node mapping maps a particular set of items to a particular node that the second node understands to not be a currently active master node; and
the second item-to-node mapping maps each item that does not belong to said particular set of items to the same node as the first item-to-node mapping.

19. The method of claim 18 wherein, for any node within the system, item-to-master-node mappings are derived by the steps of:
(a) inputting an item identifier and a first incarnation value into a hash function to produce a hash value that maps to a node;
(b) based on the node's understanding of which nodes within the system are currently active master nodes, determining whether the node to which the hash value maps is an active master node;
(c) if the node to which the hash value maps is not an active master node, then changing said incarnation value and repeating steps (a)(b) and (c) until the hash value maps to an active master node.

20. One or more non-transitory computer-readable storage media for maintaining an item-to-node mapping among multiple nodes in a multi-node system, storing one or more sequences of instructions which, when executed by one or more processors, cause performance of:
maintaining, at a first node, first data indicating state information for each master node in a plurality of master nodes;
wherein the state information in the first data indicates, for each master node in said plurality of master nodes, the first node's understanding of whether said each master node is active;
determining, at the first node, a first item-to-node mapping based on said first data;
receiving, at the first node from a second node, second data indicating state information for each master node in said plurality of master nodes;
wherein the state information in the second data indicates, for each master node in said plurality of master nodes, the second node's understanding of whether said each master node is an active master node;
wherein the first data indicates that a particular node, other than the first node, is an active master node;
wherein the second data indicates that said particular node is not an active master node;

in response to receiving the second data, the first node updating the first data to generate updated first data that indicates that said particular node is no longer an active master node; and
after updating said first data, the first node determining a second item-to-node mapping based on said updated first data.

21. The one or more non-transitory computer-readable storage media of claim 20, wherein:
receiving the second data includes the first node receiving a message from the second node relating to a request for permission to access an item, and
the second data is piggybacked on said message.

22. The one or more non-transitory computer-readable storage media of claim 20, wherein:
the first item-to-node mapping maps a particular set of items to said particular node; and
the second item-to-node mapping maps each item that does not belong to said particular set of items to the same node as the first item-to-node mapping.

23. The one or more non-transitory computer-readable storage media of claim 22, wherein determining a first item-to-node mapping includes:
(a) inputting an item identifier and a first incarnation value into a hash function to produce a hash value that maps to a node;
(b) based on the first data, determining whether the node to which the hash value maps is an active master node;
(c) if the node to which the hash value maps is not an active master node, then changing said incarnation value and repeating steps (a), (b), and (c) until the hash value maps to an active master node.

24. The one or more non-transitory computer-readable storage media of claim 20, wherein the one or more sequences of instructions, when executed by the one or more processors, further cause performance of, prior to the first node receiving the second data:
the second node sending a request to a third node for permission to access an item;
the second node waiting a predetermined amount of time for a response from the third node indicating whether access is granted; and
the second node sending the second data in response to not receiving said response within said predetermined amount of time.

25. The one or more non-transitory computer-readable storage media of claim 24, wherein the one or more sequences of instructions, when executed by the one or more processors, further cause performance of:
the second node sending the second data to all active nodes in the system.

26. The one or more non-transitory computer-readable storage media of claim 20, wherein the one or more sequences of instructions, when executed by the one or more processors, further cause performance of:
identifying, at the first node, at least one item in the first item-to-node mapping mapped to said particular node, wherein the first node has permission to access said item;
identifying a new node to which said item is mapped in the second item-to-node mapping; and
sending third data to said new node indicating that the first node has permission to access said item.

27. The one or more non-transitory computer-readable storage media of claim 20, wherein the system comprises at least one node to which items are not currently mapped in the system.

28. The one or more non-transitory computer-readable storage media of claim 20, wherein:
  the first data is in the form of an ordered bitmap, wherein the state information for each node that has at any time been an active master node is represented by a binary digit; and
  the second data is in the form of an ordered bitmap, wherein the state information for each node that has at any time been an active master node is represented by a binary digit.

29. The one or more non-transitory computer-readable storage media of claim 20, wherein the one or more sequences of instructions, when executed by the one or more processors, further cause performance of:
  the first node assuming ownership of a set of items;
  wherein the first item-to-node mapping maps each item in the set of items to a node other than the first node; and
  wherein the second item-to-node mapping maps each item in the set of items to the first node.

30. The one or more non-transitory computer-readable storage media of claim 20, wherein the one or more sequences of instructions, when executed by the one or more processors, further cause performance of:
  prior to assuming ownership of the set of items, the first node granting another node permission to access a particular item, wherein the particular item does not belong to the set of items.

31. The one or more non-transitory computer-readable storage media of claim 20, wherein the one or more sequences of instructions, when executed by the one or more processors, further cause performance of:
  identifying, at the first node, at least one particular item in the first item-to-node mapping mapped to said first node that is mapped to a new node in the second item-to-node mapping; and
  sending third data to said new node indicating that the first node now understands the particular item to be mapped to the first node.

32. The one or more non-transitory computer-readable storage media of claim 20, wherein the one or more sequences of instructions, when executed by the one or more processors, further cause performance of:
  receiving, at the first node, a request from a third node for a first item;
  wherein the first item-to-node mapping maps the first item to a fourth node;
  wherein the second item-to-node mapping maps the first item to the first node;
  receiving, at the first node, third data indicating that the first item may be remastered to the first node,
  upon receiving third data, the first node granting the third node permission to access the first item.

33. The one or more non-transitory computer-readable storage media of claim 32, wherein the third data comprises data from the fourth node indicating that the fourth node now understands the first item to be mapped to the first node.

34. The one or more non-transitory computer-readable storage media of claim 32, wherein the third data comprises data from each particular node in the plurality of nodes indicating the items cached at the particular node that should be re-mastered to the first node.

35. The one or more non-transitory computer-readable storage media of claim 32, wherein the one or more sequences of instructions, when executed by the one or more processors, further cause performance of:
  receiving, at the first node, a request from a fifth node for a second item;
  wherein the first item-to-node mapping maps the first item to the first node;
  wherein the second item-to-node mapping maps the first item to the first node; and
  the first node granting the fifth node permission to access the second item;
  wherein the granting of access to the second item occurs prior to receiving third data.

36. One or more non-transitory computer-readable storage media for maintaining an item-to-master-node mapping among a plurality of nodes in a system, storing one or more sequences of instructions which, when executed by one or more processors, cause performance of:
  using a first item-to-master-node mapping at a first node based on the first node's understanding of which nodes within the system are currently active master nodes;
  using a second item-to-master-node mapping at a second node based on the second node's understanding of which nodes within the system are currently active master nodes;
  wherein the first node's understanding of which nodes are currently active master nodes and the first item-master-node mapping are out-of-date;
  wherein the second node's understanding of which nodes are currently active master nodes and the second item-master-node mapping are not out-of-date; and
  wherein the first node uses the first item-to-master-node mapping concurrently with the second node using the second item-to-master-node mapping.

37. The one or more non-transitory computer-readable storage media of claim 36, wherein:
  the first item-to-node mapping maps a particular set of items to a particular node that the second node understands to not be a currently active master node; and
  the second item-to-node mapping maps each item that does not belong to said particular set of items to the same node as the first item-to-node mapping.

38. The one or more non-transitory computer-readable storage media of claim 37, wherein, for any node within the system, item-to-master-node mappings are derived by the steps of:
  (a) inputting an item identifier and a first incarnation value into a hash function to produce a hash value that maps to a node;
  (b) based on the node's understanding of which nodes within the system are currently active master nodes, determining whether the node to which the hash value maps is an active master node;
  (c) if the node to which the hash value maps is not an active master node, then changing said incarnation value and repeating steps (a), (b), and (c) until the hash value maps to an active master node.

39. A system comprising:
  a plurality of nodes wherein:
  at least one node of the plurality of nodes comprises a processor;
  each node maintains state information indicating the node's understanding of which master nodes of the plurality of master nodes are active master nodes to which items are currently mapped in said system; and
  said each node maintains an item-to-node mapping based upon the state information currently maintained at the node;
  said each node being configured to receive first data from another node in the system indicating the other node's state information;

wherein upon receiving first data indicating state information from said another node that differs from the state information maintained at said each node, said each node updates its state information by merging its original state information with the state information from said another node.

40. The system of claim 39 wherein the plurality of nodes comprises a first node whose state information differs from a second node, the first node being configured to perform the steps of:
receiving a request from a third node to access a first item that the first node's item-to-node mapping indicates is mapped to the first node; and
granting the third node permission to access the first item.

41. The system of claim 39, each node being configured to send data indicating the node's state information in every message sent by that node to another node in the plurality of nodes.

42. The system of claim 39, wherein the plurality of nodes comprises a first node, the first node being configured to, upon the failure of second node to respond to a message sent by the first node, update its state information to indicate that the second node is no longer an active master node.

43. The system of claim 42, the first node each node being configured to, upon the failure of the second node to respond to a message sent by the first node, and upon the first node updating its state information to indicate that the second node is no longer an active master node, send first data to all nodes in the plurality of nodes indicating the updated state information.

44. The system of claim 42, the first node being configured to, upon updating its state information, sending second data to each node in the plurality of nodes;
wherein the second data indicates a set of items,
wherein each item in the set of items was mapped to the first node in the first node's item-to-node mapping based on the first node's original state information; and
wherein each item in the set of items is mapped to the receiving node in the first node's item-to-node mapping based on the first node's updated state information.

45. The system of claim 42, the first node being configured to perform the steps of:
receiving a request from a third node for a first item;
wherein the first item was mapped to a fourth node in the first node's item-to-node mapping based on the first node's original state information;
wherein the first item is mapped to the first node in the first node's item-to-node mapping based on the first node's updated state information;
receiving second data indicating that the first item may be re-mastered to the first node; and
upon receiving second data, granting the third node permission to access the first item.

46. The system of claim 45, the first node being configured to perform the steps of:
receiving a request from a fifth node for a second item;
wherein the second item was mapped to the first node in the first node's item-to-node mapping based on the first node's original state information;
wherein the second item is mapped to the first node in the first node's item-to-node mapping based on the first node's updated state information; and
granting the fifth node permission to access the first item;
wherein the granting of access to the second item occurs prior to receiving second data.

47. The system of claim 39, wherein, for each particular node in the plurality of nodes, the particular node's item-to-node mapping indicates the particular node's understanding of, for each data item of a plurality of data items in a database system, which node in the plurality of master nodes manages access permissions to the data item.

* * * * *

UNITED STATES PATENT AND TRADEMARK OFFICE
CERTIFICATE OF CORRECTION

| | | |
|---|---|---|
| PATENT NO. | : 8,671,151 B2 | Page 1 of 1 |
| APPLICATION NO. | : 11/657778 | |
| DATED | : March 11, 2014 | |
| INVENTOR(S) | : Joshi et al. | |

It is certified that error appears in the above-identified patent and that said Letters Patent is hereby corrected as shown below:

On Title page, column 1, under Inventors, line 3, delete "Arvind Nithrakashvap," and insert
-- Arvind Nithrakashyap, --, therefor.

In the Specification

In column 15, line 58, delete "10" and insert -- 110 --, therefor.

Signed and Sealed this
Twelfth Day of August, 2014

Michelle K. Lee
*Deputy Director of the United States Patent and Trademark Office*